(12) United States Patent  
Killamsetti et al.

(10) Patent No.: US 10,691,370 B2  
(45) Date of Patent: Jun. 23, 2020

(54) ASSIGNMENT OF A DATA IDENTIFIER TO FIRST AND SECOND VOLUMES

(71) Applicant: HEWLETT PACKARD ENTERPRISE DEVELOPMENT LP, Houston, TX (US)

(72) Inventors: Praveen Killamsetti, San Jose, CA (US); Tomasz Barszczak, San Jose, CA (US); Naveen Bali, Chapel Hill, NC (US); Michael E. Root, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 16/103,492

(22) Filed: Aug. 14, 2018

(65) Prior Publication Data

US 2020/0057564 A1 Feb. 20, 2020

(51) Int. Cl.
*G06F 12/00* (2006.01)
*G06F 3/06* (2006.01)

(52) U.S. Cl.
CPC ............ *G06F 3/065* (2013.01); *G06F 3/067* (2013.01); *G06F 3/0619* (2013.01); *G06F 3/0644* (2013.01)

(58) Field of Classification Search
None
See application file for complete search history.

(56) References Cited

U.S. PATENT DOCUMENTS

| 8,307,179 | B2 | 11/2012 | Emaru et al. |
| 8,380,955 | B1 | 2/2013 | Wu et al. |
| 8,782,358 | B2 | 7/2014 | Broido et al. |
| 8,935,206 | B2 | 1/2015 | Aguilera et al. |
| 9,141,290 | B2 | 9/2015 | Hallak et al. |
| 9,152,337 | B2 | 10/2015 | Kono et al. |
| 9,152,642 | B2 | 10/2015 | Harrison et al. |
| 2016/0154834 | A1 | 6/2016 | Friedman |
| 2017/0249222 | A1 | 8/2017 | Patnaik et al. |

OTHER PUBLICATIONS

Christoph Burgdorf, "The Anatomy of a Git Commit", Nov. 18, 2014, 11 pages. https://blog.thoughtram.io/git/2014/11/18/the-anatomy-of-a-git-commit.html.

Oracle, "Fusion Middleware Administering Oracle Unified Directory," Sep. 2, 2010, 34 pages. https://docs.oracle.com/cd/E52734_01/oud/OUDAG/replication_model.htm#OUDAG00058.

*Primary Examiner* — Daniel D Tsui
(74) *Attorney, Agent, or Firm* — Hewlett Packard Enterprise Patent Department (57) ABSTRACT

According to examples, an apparatus may include a processor and a non-transitory machine-readable storage medium comprising instructions executable by the processor to assign a first object identifier and a data identifier to a first volume, the first object identifier being assigned exclusively to the first volume. The instructions may also be executable by the processor to identify an identifier of a second volume, determined whether the identifier of the second volume matches the data identifier, and based on a determination that the identifier of the second volume matches the data identifier of the first volume, configure a replication relationship between the first volume and the second volume.

20 Claims, 9 Drawing Sheets

```
ASSIGN A FIRST OBJECT IDENTIFIER AND A DATA IDENTIFIER TO A
FIRST VOLUME
502
```
↓
```
REPLICATE THE FIRST VOLUME TO GENERATE A SECOND VOLUME
504
```
↓
```
ASSIGN A SECOND OBJECT IDENTIFIER AND THE DATA IDENTIFIER
TO THE SECOND VOLUME
506
```
↓
```
IDENTIFY A SNAPSHOT IN A REPLICATION BRANCH OF SNAPSHOTS
THAT IS ASSIGNED THE DATA IDENTIFIER
508
```
↓
```
SYNC THE FIRST VOLUME FROM THE IDENTIFIED SNAPSHOT
510
```

```
REPLICATE OR MOVE THE SECOND VOLUME TO GENERATE A THIRD
VOLUME
602
```
↓
```
ASSIGN A THIRD OBJECT IDENTIFIER AND THE DATA IDENTIFIER TO THE
THIRD VOLUME
604
```
↓
```
CONFIGURE A REPLICATION RELATIONSHIP
604
```

NON-TRANSITORY MACHINE-READABLE STORAGE MEDIUM
1000

BLOCKS 900-912

BASED ON A DETERMINATION THAT DATA OF A SECOND SNAPSHOT MATCHES DATA OF THE FIRST VOLUME, ASSIGN THE DATA IDENTIFIER TO THE SECOND SNAPSHOT
1002

BASED ON A DETERMINATION THAT THE DATA OF THE SECOND SNAPSHOT DOES ONT MATCH THE DATA OF THE FIRST VOLUME, ASSIGN A SECOND DATA IDENTIFIER TO THE SECOND SNAPSHOT
1004

DETERMINE WHETHER DATA OF A THIRD SNAPSHOT MATCHES DATA OF THE FIRST VOLUME
1006

BASED ON A DETERMINATION THAT THE DATA OF THE THIRD SNAPSHOT MATCHES THE DATA OF THE FIRST VOLUME, ASSIGN THE DATA IDENTIFIER TO THE THIRD SNAPSHOT
1008

BASED ON A DETERMINATION THAT THE DATA OF THE THIRD SNAPSHOT DOES NOT MATCH THE DATA OF THE FIRST VOLUME, ASSIGN A THIRD DATA IDENTIFIER TO THE THIRD SNAPSHOT
1010

STORE IDENTIFIER ASSIGNMENTS IN A DATA STORE
1012

*FIG. 10*

ASSIGNMENT OF A DATA IDENTIFIER TO FIRST AND SECOND VOLUMES

BACKGROUND

Storage systems may be used for a variety of purposes including access to shared data by multiple users and data storage. Storage systems may include storage devices that are collocated with each other and/or located at multiple locations. Data stored at storage devices may be replicated and the replicated copies of the data may be stored on multiple storage devices to safeguard against the failure of a single storage device. As such, when a storage device fails or the data in the storage device is inadvertently erased or edited, a copy of the desired data may be retrieved from another storage device.

BRIEF DESCRIPTION OF THE DRAWINGS

Features of the present disclosure may illustrated by way of example and not limited in the following figure(s), in which like numerals indicate like elements, in which.

DETAILED DESCRIPTION

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Disclosed herein are apparatuses and methods for assigning a common data identifier to multiple volumes having a common data source. Particularly, in addition to a first object identifier that is assigned exclusively to a first volume, a data identifier may also be assigned to the first volume. Moreover, in addition to a second object identifier that is assigned exclusively to a second volume that is a replica of the first volume, the same data identifier that is assigned to the first volume may be assigned to the second volume. In one regard, the data identifier of the first volume may be assigned to any volumes or snapshots that have a common data source, e.g., have the same data, as the first volume data source regardless of whether the volumes or snapshots are moved, replicated, or the like and regardless of whether the volumes or snapshots are stored in the same or different storage nodes. As such, for instance, volumes or snapshots having the common data source may be readily identified from the data identifiers assigned to the volumes or snapshots. In addition, the data identifiers assigned to the volumes or snapshots may be invariant, e.g., may not be changed once the data identifiers have been assigned.

According to examples, a determination as to whether the identifier of a configuration candidate volume matches the data identifier of a first volume may be made. Based on a determination that the identifier of the configuration candidate volume matches the data identifier, a replication relationship between the first volume and the configuration candidate volume may be configured, e.g., set-up. That is, the configuration candidate volume, while configured for the replication relationship with the first volume, may be synchronized with the first volume such that changes to the first volume may continuously or periodically be propagated to the configuration candidate volume. In addition, the synchronization may be synchronous or asynchronous. In instances in which the first volume is to be restored, the first volume may be restored using the configuration candidate volume.

It should be understood that references to a configuration of a replication relationship between volumes may also include a reconfiguration of a previously existing replication relationship. Likewise, it should be understood that references to a sync between volumes and/or between a snapshot and volume may also include a resync of a previous sync.

A technical problem associated with managing multiple volumes and snapshots may be that tracking and identifying volumes or snapshots having desired data may be a time-consuming and resource intensive process. This may be exacerbated in instances in which the volumes or snapshots are moved or severed from sync replication relationships. For instance, identifying volumes or snapshots having the desired data that have been severed from replication relationships, e.g., volumes or snapshots that are related to each other, may include comparing, bit by bit, the data in the volumes or snapshots to determine whether the data in the volumes or snapshots are the same with respect to each other. As a result, for instance, when a volume is to be synced, e.g., restored to a current or a previous version, identifying an appropriate snapshot from which to sync, e.g., replicate, the volume may consume a great deal of time and resources.

Through implementation of aspects of the present disclosure, e.g., assigning the same data identifier to volumes and snapshots having a common data source, the volumes and snapshots having the common data source may readily be identified from the data identifiers assigned to the volumes and snapshots. That is, the volumes and snapshots having the common data source may be identified without having to compare the data contained in the volumes or snapshots. Thus, for instance, snapshots that are in-sync, e.g., have the same version of data, with a volume (or with other snapshots) may readily be identified based on the data identifiers assigned to the snapshots. In addition, as the data identifiers may be invariant, the relationships between the snapshots and volumes having the common data source may remain known even when the snapshots or volumes are moved, replicated, etc. Accordingly, volumes and snapshots having common data sources (e.g., starting points) may be identified from the data identifier assigned to the volumes and snapshots. As a result, for instance, when an original volume that has been moved or replicated, or for which snapshots have been created, is to be synced, the snapshot from which the volume is to be synced may readily be identified from the data identifier of the original volume.

A technical improvement provided by the apparatuses and methods disclosed herein may be that a processor may quickly and efficiently identify a suitable snapshot for use in restoring a volume through use of the data identifiers disclosed herein. In addition, the processor may quickly and efficiently, e.g., with a reduced amount of computational resource usage, identify the snapshot regardless of whether the snapshot was severed, e.g., moved, replicated, etc., from a sync replication relationship with the intended volume. As a result, the processor may restore an intended volume quickly, which may also reduce downtime of the intended volume.

As used herein, a "volume" may refer to a manageable entity that contains data for a given application or a logical unit number (LUN). As used herein "snapshot" may refer to a temporal dependent view of a collection of data. In other words, a data source and applications operating on data being housed in the data source may have a given state of the data as it exists at a particular instant in time captured as a snapshot. A "data source' may refer to a volume or collection of volumes that house the data for applications. An "application" may refer to a set of software instructions, a service, or a system that interacts with data housed at the data source. A "replicated volume" or "replicated source" may refer to a mirror of a local volume or a first volume. That is, the replicated volume (e.g., a second volume) may be a remote volume that is external to a local volume and that is being kept in synchronization with the local volume via some mechanism, such as synchronous block-based data replication.

Figure 1:
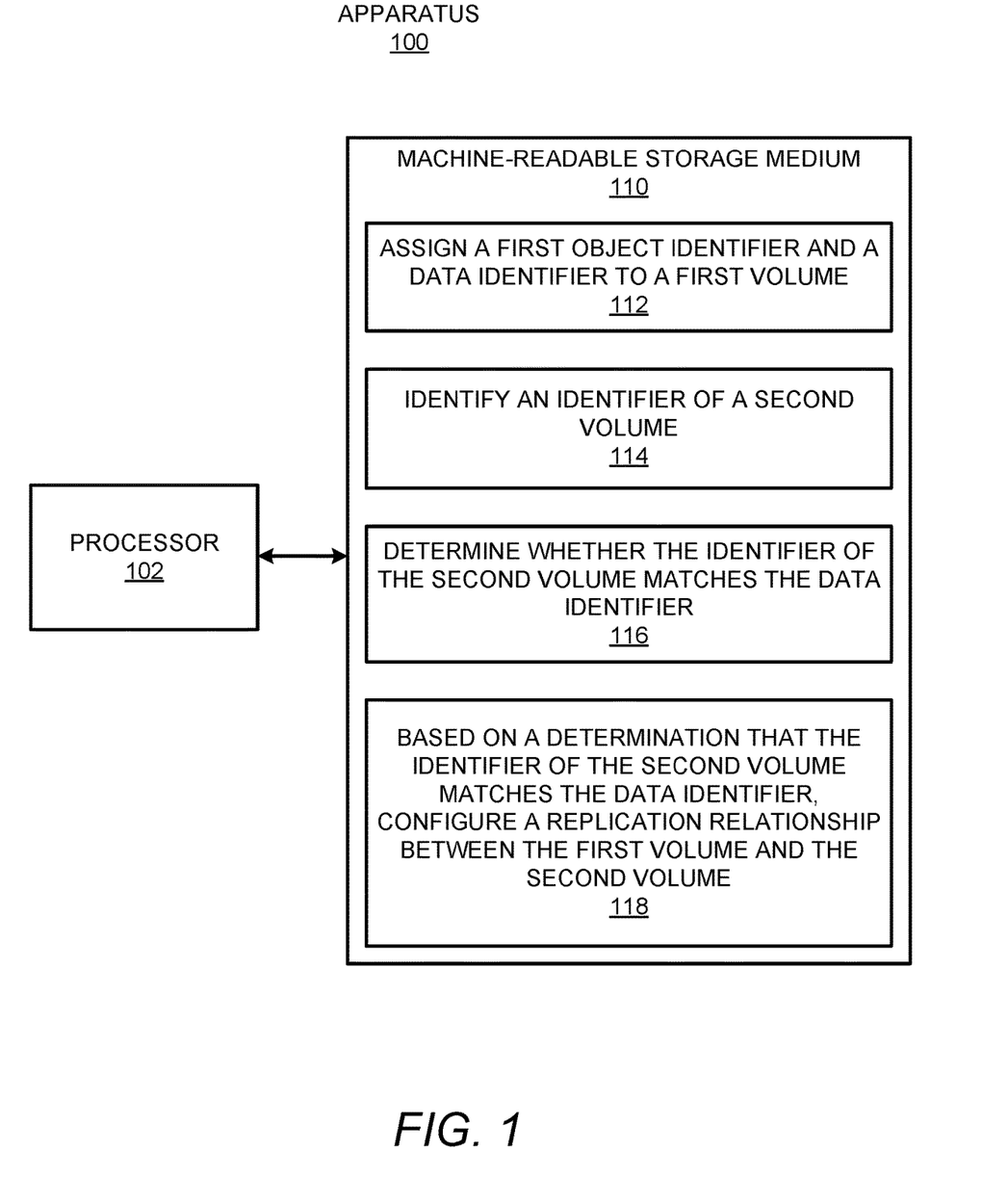
FIG. 1 shows a block diagram of an example apparatus that may manage tracking of volumes through use of a data identifier.
Figure 2:
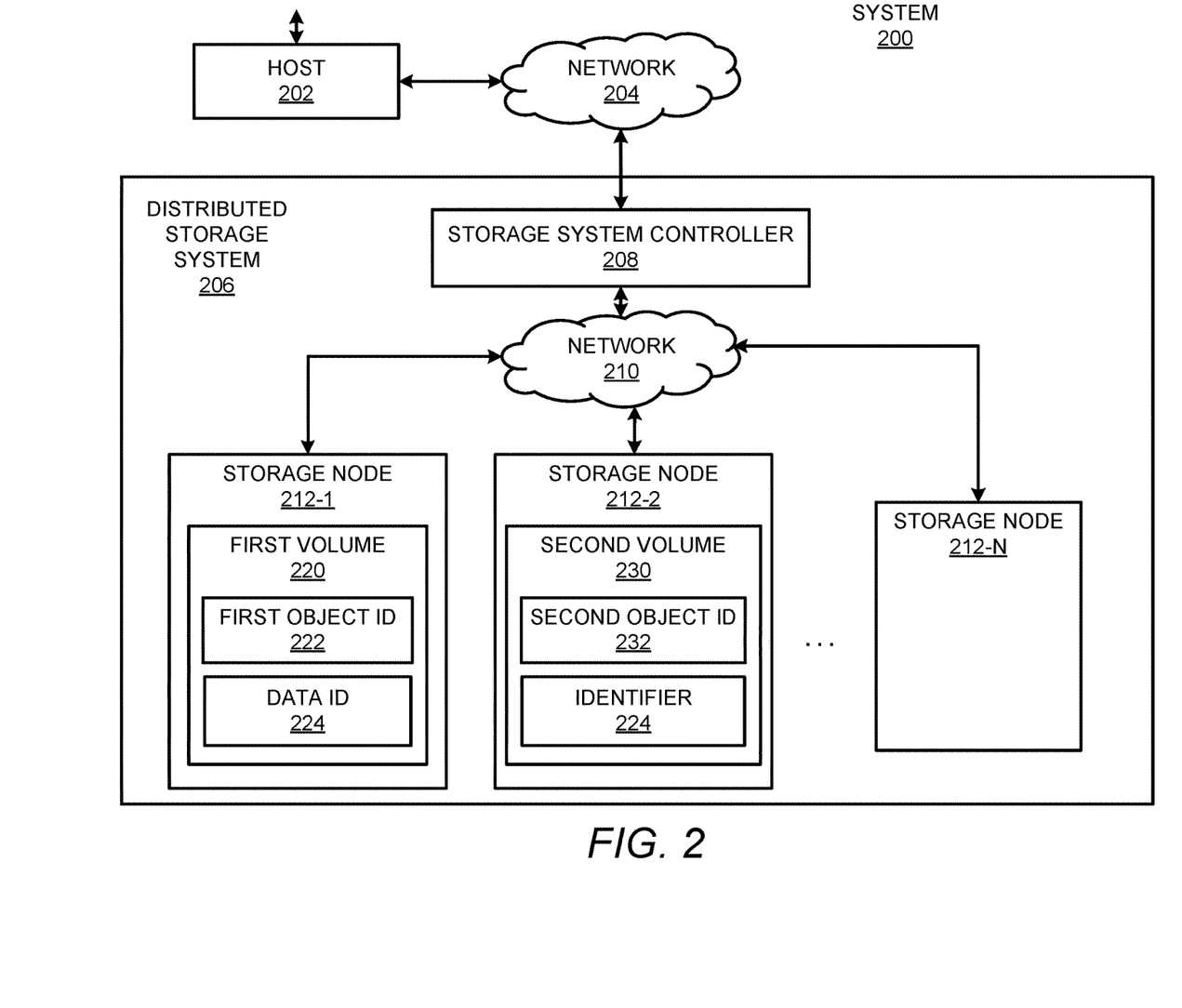
FIG. 2 depicts a block diagram of an example system that may include a host that may be communicatively coupled via a network to a distributed storage system.

Reference is first made to FIGS. 1 and 2. FIG. 1 shows a block diagram of an example apparatus 100 that may manage tracking of volumes through use of a data identifier. FIG. 2 depicts a block diagram of an example system 200 that may include a host 202 that may be communicatively coupled via a network 204 to a distributed storage system 206. It should be understood that the example apparatus 100 depicted in FIG. 1 and the system 200 depicted in FIG. 2 may include additional features and that some of the features described herein may be removed and/or modified without departing from either of the scopes of the apparatus 100 or the system 200.

The apparatus 100 may be a computing device, a server, a storage system controller, a storage node controller, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 is depicted as including a single processor 102, it should be understood that the apparatus 100 may include multiple processors, multiple cores, or the like, without departing from a scope of the apparatus 100.

The apparatus 100 may also include a machine-readable storage medium 110 that may have stored thereon machine readable instructions 112-118 (which may also be termed computer readable instructions) that the processor 102 may execute. The machine-readable storage medium 110 may be an electronic, magnetic, optical, or other physical storage device that contains or stores executable instructions. The machine-readable storage medium 110 may be, for example, Random Access memory (RAM), an Electrically Erasable Programmable Read-Only Memory (EEPROM), a storage device, an optical disc, and the like. The machine-readable storage medium 110 may be a non-transitory machine-readable storage medium, where the term "non-transitory" does not encompass transitory propagating signals.

As shown in FIG. 2, the distributed storage system 206 may include a storage system controller 208, which, according to examples, may be equivalent to the apparatus 100 depicted in FIG. 1. The distributed storage system 206 may also include a plurality of storage nodes 212-1 to 212-N, where the variable "N" is a value greater than one. The storage system controller 208 and the plurality of storage nodes 212-1 to 212-N may be communicatively coupled to one another via a network 210. The storage system controller 208 may receive read requests and write requests from the host 202. In response to receiving a read request, the storage system controller 208 may read data from one or more of the storage nodes 212-1 to 212-N. In response to receiving a write request, the storage system controller 208 may write data to one or more of storage nodes 212-1 to 212-N.

The storage system controller 208 may store data on the storage nodes 212-1 to 212-N in a redundant manner (e.g., using erasure coding or data mirroring), so that even if one or more of the storage nodes 212-1 to 212-N were to fail, data loss may be prevented. To allow for the redundant storage of data, the storage nodes 212-1 to 212-N may operate independently of one another. That is, the failure of one or more of the storage nodes 212-1 to 212-N may not cause the failure of the remainder of the storage nodes 212-1 to 212-N. The storage nodes 212-1 to 212-N may be geographically distributed (e.g., distributed at geographically disparate locations). A consequence of the distributed nature of the storage nodes 212-1 to 212-N may be an asymmetry between intra-node and inter-node data retrieval. In other words, a first storage node 212-1 may read data from or write data to locally more quickly, than if the first storage node 212-1 were to read data from or write data to a neighboring storage node 212-2.

The network 204 and/or the network 210 may include a LAN, WAN, MAN, wired or wireless network, private or public network, etc. While the storage system controller 208 is depicted as a component that is separate from each of the storage nodes 212-1 to 212-N, the storage system controller 208 may be instantiated within one or more of the storage nodes 212-1 to 212-N. In these examples, a storage system controller 208 instantiated in one or more of the storage nodes 212-1 may be equivalent to the apparatus 100 depicted in FIG. 1. In addition, in the case that the storage system controller 208 may be instantiated within the first storage node 212-1 and the second storage node 212-2, the first storage node 212-1 may be known as a group leader and the second storage node 212-2 may be known as a backup leader (or vice versa).

With reference to both FIGS. 1 and 2, the processor 102 may fetch, decode, and execute the instructions 112 to assign a first object identifier 222 and a data identifier 224 to a first volume 220. The first volume 220 may be created and/or stored in a first storage node 212-1 and the processor 102 may assign the first object identifier 222 and the data identifier 224 to the first volume 220 during or after creation and/or storage of the first volume 220. Although the first volume 220 is depicted as being stored in a storage node 212-1, it should be understood that the first volume 220 may be stored across multiple storage nodes 212-1, e.g., an array of storage nodes 212-1.

The first object identifier 222 may be an arrangement of bits, numbers, letters, symbols, or the like, that may distinguish the first volume from other volumes. In this regard, the processor 102 may exclusively assign the first object identifier 222 to the first volume 220, e.g., the first object identifier 222 may be unique to the first volume 220 such that the first volume 220 alone may be identified by the first object identifier 222. The data identifier 224 may also be an arrangement of bits, numbers, letters, symbols, or the like, that the processor 102 may assign to the first volume 220 as a distinguishing identifier. However, the data identifier 224 may differ from the first object identifier 222 in that the data identifier 224 may be assigned to multiple volumes in instances in the volumes have the same data. That is, the processor 102 may assign the same data identifier 224 to replicas or snapshots of the first volume 220 as well as snapshots of replica volumes of the first volume 220. In addition, the data identifier 224 may, once assigned to a volume or snapshot, be invariant, e.g., may not be changed. In any regard, the processor 102 may randomly generate the data identifier 224, for instance, as a 64 bit number. In this regard, the processor 102 may generate the data identifier 224 separately from the data contained in the volume, e.g., the data identifier 224 may not be derived from the data contained in the volume.

The processor 102 may fetch, decode, and execute the instructions 114 to identify an identifier of a second volume 230. The second volume 230 may be created and/or stored in a second storage node 212-2 and the processor 102 may have assigned the second volume 230 with a second object identifier 232 and an identifier 224 during or after creation and/or storage of the second volume 230. Although the second volume 230 is depicted as being stored in a storage node 212-2, it should be understood that the second volume 220 may be stored across multiple storage nodes 212-2, e.g., an array of storage nodes 212-2.

In instances in which the second volume 230 includes the same data as the first volume 220, the processor 102 may have assigned the second volume with the same data identifier 224 as the first volume 220. However, if the data of the first volume 220 or the second volume 230 has been changed, the first volume 220 may have a different data identifier than the second volume 230. In other words, if the data of the first volume 220 differs from the data of the second volume 230, the second volume 230 may be construed as being out-of-sync with the first volume 220. In various instances in which the identifier 224 of the second volume 230 matches the data identifier 224 of the first volume 220, the second volume 230 may be construed as a replica of the first volume 220.

In one regard, the processor 102 may assign the same data identifier 224 to the second volume 230 as was assigned to the first volume 220 because the second volume 230 includes the same data as the first volume 220, e.g., the first volume 220 shares the common data source with the second volume 230. In addition, the processor 102 may assign the same data identifier 224 to additional volumes having the same version of the data as in the first volume 220 as the data in the first volume 220 is the common data source to the additional volumes. However, the processor 102 may exclusively assign the second object identifier 232 to the second volume 230, e.g., the second object identifier 232 may be unique to the second volume 230 such that the second volume 230 alone may be identified by the second object identifier 232. In addition, the second object identifier 232 may be an arrangement of bits, numbers, letters, symbols, or the like, that may uniquely distinguish the second volume 230 from other volumes.

It should be understood that the first object identifier 222 and the data identifier 224 are depicted in FIG. 2 as representing a relationship between the first object identifier 222 and the data identifier 224 and the first volume 220. Likewise, it should be understood that the second object identifier 232 and the data identifier 224 are depicted in FIG. 2 as representing a relationship between the second object identifier 232 and the data identifier 224 and the second volume 230. As such, the object identifiers 222, 232 and the data identifiers 224 may not be stored in the storage nodes 212-1, 212-2. Instead, the processor 102 may store the assignment of the data identifier 224 to the first volume 220 and the second volume 230 in a data store (not shown), which may be part of the storage system controller 208, a storage node 212-1, or the like. The processor 102 may also store the assignment of the first object identifier 222 to the first volume 220 and the assignment of the second object identifier 232 to the second volume 230 in the data store. By way of example, the processor 102 may store the assignments along with the identifiers in a look up table or other searchable manner.

The processor 102 may fetch, decode, and execute the instructions 118 to, based on a determination that the identifier of the second volume 230 matches the data identifier 224 of the first volume 220, configure a replication relationship between the first volume 220 and the second volume 230. As the matching data identifiers 224 may be an indication that the second volume 230 and the first volume 220 each includes the same version of data from a common data source, the data in the first volume 220 may be restored to a particular state. While configured for the replication relationship, the second volume 230 may be synchronized with the first volume 220 such that changes to the first volume 220 may be continuously or periodically propagated to the second volume 230. The synchronization may be synchronous or asynchronous.

According to examples, the processor 102 may, through use of the data identifiers, identify a volume with which to configure for a replication relationship with the first volume 220 in a simple and efficient manner, e.g., without having to compare the states of the data in the first volume 220 or the volume. In addition or alternatively, the processor may restore the first volume 220 using the data in the volume for which a replication relationship with the first volume 220 has been configured.

According to examples, the processor 102 may also create a snapshot of the second volume 230. The processor 102 may also determine that the second volume is in-sync with the first volume 220 and based on that determination, may assign the data identifier 224 to the snapshot of the second volume 230. The processor 102 may further assign snapshot identifier to the snapshot of the second volume 230, in which the snapshot identifier is unique to the snapshot.

However, based on a determination that the second volume 230 has not been assigned the data identifier 224 of the first volume 220, the processor 102 may determine that the data in the second volume 230 and the data in the first volume 220 do not match. As a result, the processor 102 may not configure a replication relationship between the first volume 220 and the second volume 230. In addition, the processor 102 may consider the data identifiers of additional candidate volumes until the processor 102 identifies a candidate volume having a matching data identifier 224 from the list of sync candidate volumes. The processor 102 may further configure a replication relationship between the first volume 220 and the candidate volume having the matching data identifier 224. In addition, the processor 102 may restore the first volume 220 using the sync candidate volume having the matching data identifier 224.

In addition, the processor 102 may create a third volume (not shown) in an array of storage nodes, e.g., the first storage node 212-1, the second storage node 212-2 and/or in a third storage node 212-3. The processor 102 may similarly create additional volumes. Each of the first volume 220, the second volume 230, and any additional volumes created from first volume 220, e.g., replicas of the first volume 220, may be considered as having a common data source, which, in this example is the version of the data in the first volume 220 at the time the second volume 230 and/or the addition volumes were created.

According to examples, the processor 102 may replicate or move the second volume 230 to generate a third volume. In addition, the processor 102 may assign the data identifier 224 and a third object identifier to the third volume, in which the third object identifier may be assigned exclusively to the third volume. The processor 102 may further configure a replication relationship between the first volume 220 and the third volume based on the third volume having the same data identifier 224 as the first volume 220. In this regard, even though the third volume was not replicated directly from the first volume 220, the third volume may still be configured to have a replication relationship with the first volume 220. The replication relationship may thus be configured between the volumes following volume moves and/or replications through use of the data identifier 224.

Figure 3:
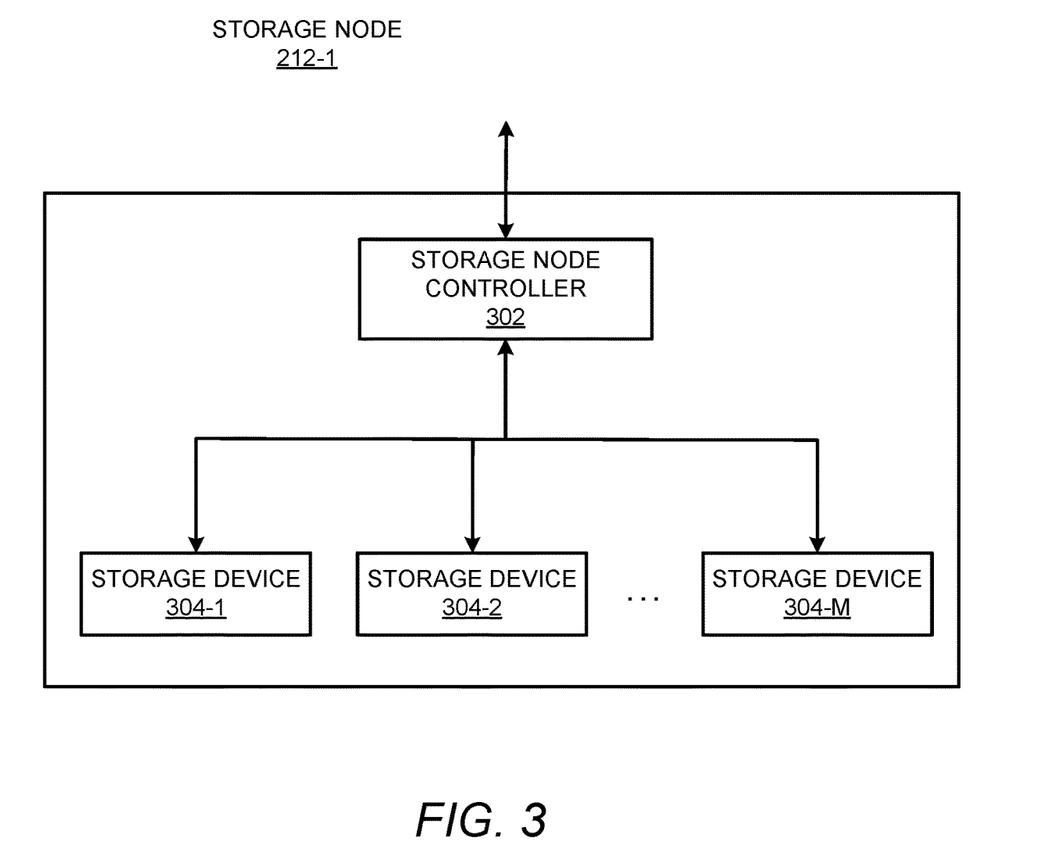
FIG. 3 depicts a block diagram of an example storage node of the distributed storage system depicted in FIG. 2.

Turning now to FIG. 3, there is shown a block diagram of an example storage node 212-1 of the distributed storage system 206 depicted in FIG. 2. As shown, the storage node 212-1 may include a storage node controller 302 communicatively coupled to a plurality of storage devices 304-1 to 304-M, in which the variable "M" may represent a value greater than one. The storage node controller 302, according to examples, may be equivalent to the apparatus 100 depicted in FIG. 1. In any regard, the storage node controller 302 may receive read requests and write requests from the storage system controller 208. In response to receipt of a read request, the storage node controller 302 may read data from one or more of the storage devices 304-1 to 304-M. In response to receipt of a write request, the storage node controller 302 may write data to one or more of the storage devices 304-1 to 304-M. The storage devices 304-1 to 304-M may include one or more hard disk drives (HDDs), solid state drives (SSDs), optical drives, etc.

According to examples, the storage node controller 302 may store data in volumes in the storage devices 304-1 to 304-M in a redundant manner, so that even if one or more of the storage devices 304-1 to 304-M were to fail, data may not be lost. Thus, for instance, the storage node controller 302 may store the first volume 220 in a first storage device 304-1 and the second volume 230 in a second storage device 304-2. To allow for the redundant storage of data, the storage devices 304-1 to 304-M may operate independently of one another. That is, the failure of one or more of the storage devices 304-1 to 304-M may not cause the failure of the remainder of the storage devices 304-1 to 304-M. In contrast to the distributed nature of the distributed storage system 206, the components of a storage node 212-1 may be located at the same geographical location. In some examples, all of the storage devices 304-1 to 304-M of a storage node 212-1 may be located within a single chassis. One consequence of such a physical arrangement may be that the storage node controller 302 may read data from and write data to the storage devices 304-1 to 304-M with minimal delay.

While one storage node controller 302 has been depicted in FIG. 3, it may be understood that one or more storage node controllers may be employed (e.g., in an active/standby arrangement). Further, it may be understood that the other storage nodes 212-2 to 212-N may contain similar components as storage node 212-1.

Instead of the machine-readable storage medium 110, the apparatus 100 may include hardware logic blocks that may perform functions similar to the instructions 112-118. In other examples, the apparatus 100 may include a combination of instructions and hardware logic blocks to implement or execute functions corresponding to the instructions 112-118. In any of these examples, the processor 102 may implement the hardware logic blocks and/or execute the instructions 112-118. As discussed herein, the apparatus 100 may also include additional instructions and/or hardware logic blocks such that the processor 102 may execute operations in addition to or in place of those discussed above with respect to FIG. 1.

Figure 4A:
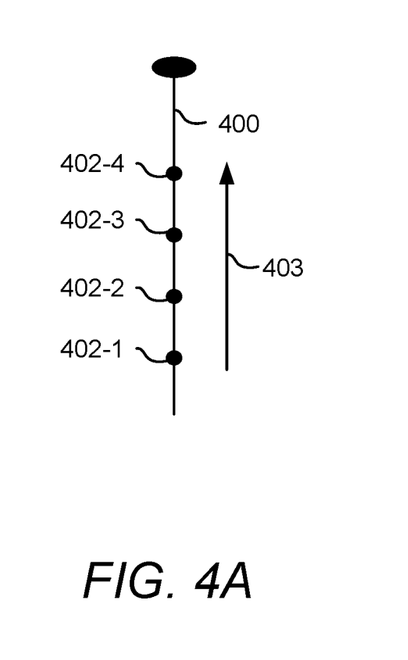
FIGS. 4A-4C, respectively, depict diagrams of an example replication branch or multiple example replication branches of snapshots.
Figure 4B:
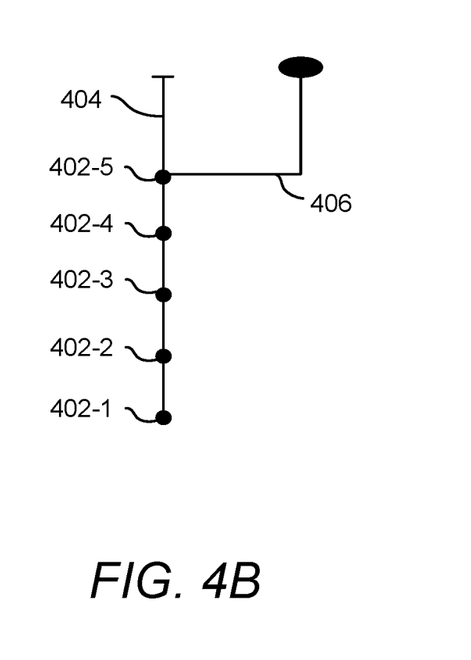
Figure 4C:
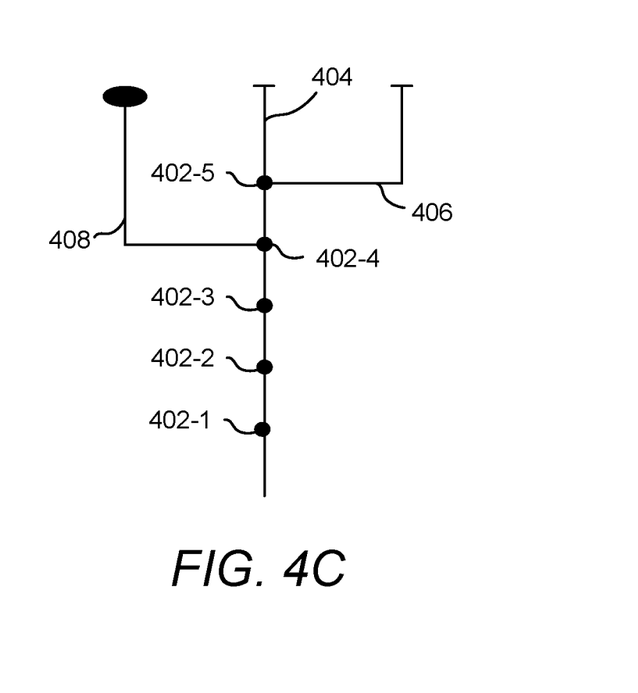

Reference is made to FIGS. 4A-4C, which respectively depict diagrams of an example replication branch or multiple example replication branches of snapshots. With reference first to FIG. 4A, a replication branch 400 of snapshots 402 may include a plurality of snapshots 402-1 to 402-4. Each of the snapshots 402-1 to 402-4 may be a snapshot of the first volume 220 and may contain the same data state as the first volume 220 (shown in FIG. 2). As such, each of the snapshots 402-1 to 402-4 may have been assigned the same data identifier 224 as the first volume 220. For instance, each of the snapshots 402-1 to 402-4 may be snapshots of replica volumes of the first volume 220 stored on different storage devices 304-1 to 304-M of a storage node 212-1, on different storage devices of multiple storage nodes 212-1, 212-2, etc. In other examples, the snapshots 402-1 to 402-4 may be snapshots of the first volume 220 created at different times (as denoted by the arrow 403) while the data in the first volume 220 remained in an unaltered state.

The replication branch 400 may also be assigned a replication branch identifier (e.g., B1) that identifies the snapshots 402-1 to 402-4 that are included in that replication branch 400. That is, for instance, each of the snapshots 402-1 to 402-4 in the replication branch 400 may be assigned the same replication branch identifier (B1). In addition, the replication branch 400 may be considered to be the active replication branch for the first volume 220. That is, the replication branch 400 may include the snapshot 402-1 to 402-4 from which the first volume 220 may be synced.

FIG. 4B shows, for instance, a downstream volume branch 404, which may be a replication branch of the second volume 230. As the second volume 230 and the first volume 220 may have the common data source, the downstream volume branch 404 may include the snapshots 402-1 to 402-4. As such, the snapshots 402-1 to 402-4 in the downstream volume branch 404 may have the same data identifier 224 as the snapshots 402-1 to 402-4 in the replication branch 400. In other words, in instances in which data of the snapshots 402-1 to 402-4 matches the data of the first volume 220, the data identifier 224 may be assigned to the snapshots 402-1 to 402-4. However, in instances in which the data of the snapshots 402-1 to 402-4 does not match the data of the first volume 220, the snapshots 402-1 to 402-4 may be assigned with other data identifiers. The downstream volume branch 404 may also be assigned a second branch identifier.

In addition, a second replication branch 406 may be created, for instance, based on the first volume 220 being synced, e.g., the data stored in the first volume 220 being modified, and a new snapshot 402-5 of the first volume 220 being created. That is, additional snapshots of the first volume 220 may be assigned the replication branch identifier of the second replication branch 406. In addition, the updated first volume 220 may be assigned an updated data identifier and thus, the new snapshot 402-5 may also be assigned the updated data identifier. The second replication branch 406 may be assigned a third branch identifier and the second replication branch 406 may be an active branch because the new snapshot 406 may be the most recent snapshot of a current data state of the first volume 220. Thus, for example, in instances in which the first volume 220 is to be synced to a most recent data state, the processor 102 may sync the first volume 220 from the new snapshot 408.

Turning now to FIG. 4C, there is shown an example in which the first volume 220 is to be synced using a snapshot 402-4 other than the new snapshot 402-5. That is, FIG. 4C may show an example in which the first volume 220 is synced from data in a prior version of first volume 220. Through recovery of the first volume 220 to the earlier data state, a third replication branch 408 may be created from the earlier snapshot 402-4. The active branch may now depend from the earlier snapshot 402-4 and thus, new snapshots may be assigned the same data identifier as the earlier snapshot 402-4 until the data in the first volume 220 changes and a new data identifier is assigned to the modified first volume 220. The replication branch 408 may also be assigned a fourth branch identifier.

Figure 5:
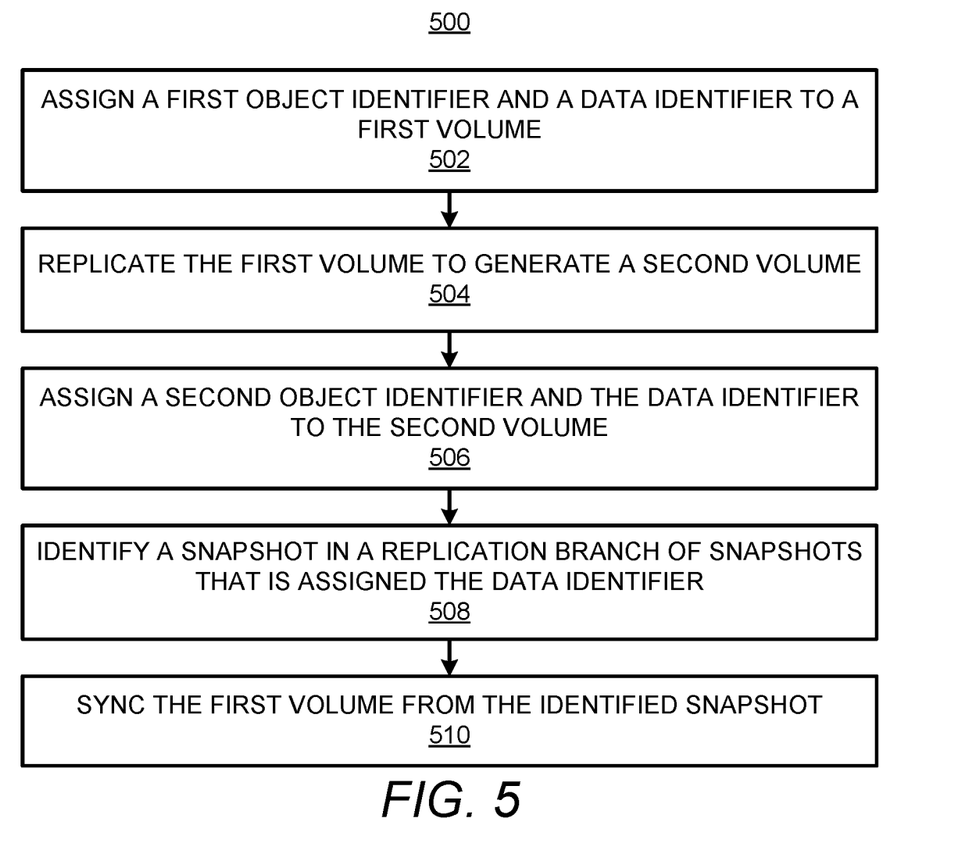
FIG. 5 depicts a flow diagram of an example method for syncing a first volume from an identified snapshot.

Various manners in which the apparatus 100 may operate are discussed in greater detail with respect to the methods 500-800 respectively depicted in FIGS. 5-8. Particularly, FIG. 5 depicts a flow diagram of an example method 500 for syncing a first volume 220 from an identified snapshot. In addition, FIGS. 6-8 respectively depict flow diagrams of example methods 600-800 pertaining to various operations that the processor 102 may implement with regard to additional volumes/snapshots in a distributed storage system 206. It should be understood that the methods 500-800 may include additional operations and that some of the operations described therein may be removed and/or modified without departing from the scopes of the methods 500-800. The descriptions of the methods 500-800 are made with reference to the features depicted in FIGS. 1-4C for purposes of illustration.

With reference first to FIG. 5, at block 502, the processor 102 may assign a first object identifier 222 and a data identifier 224 to a first volume 220. The processor 102 may assign the first object identifier 222 and the data identifier 224 to the first volume 220 as discussed above with respect to FIG. 1.

At block 504, the processor 102 may replicate the first volume 220 to generate a second volume 230. The processor 102 may replicate the first volume 220 to create the second volume 230 in a second storage node 212-2. In other examples, however, the processor 102 may create the second volume 230 in the first storage node 212-1. In still other examples, the processor 102 may create a third volume (not shown) in the first storage node 212-1, the second storage node 212-2 and/or in a third storage node 212-3.

At block 506, the processor 102 may assign the data identifier 224 and a second object identifier 232 to the second volume 230. The processor 102 may assign the same data identifier 224 to the second volume 230 as was assigned to the first volume 220 because the second volume 230 includes the same data as the first volume 220. The processor 102 may also exclusively assign the second object identifier 232 to the second volume 230, e.g., the second object identifier 232 may be unique to the second volume 230 such that the second volume 230 alone may be identified by the second object identifier 232.

At block 508, the processor 102 may identify a snapshot in a replication branch of snapshots that is assigned the data identifier 224 assigned to the first volume 220. For instance, the processor 102 may identify a snapshot 402-4 that has been assigned the same data identifier 224 as the first volume 220, in which the data identifier 224 may correspond to the first volume 220 having a desired data state. In this regard and as discussed above with respect to FIGS. 4B and 4C, the identification of the snapshot 402-4 may depend on whether the first volume 220 is to be synced to, for instance, a current data state or a prior data state.

At block 510, the processor 102 may sync the first volume 220 from the identified snapshot 402-4. That is, for instance, the processor 102 may replace and/or update the data in the first volume 220 with the data in the identified snapshot 402-4. In one regard, therefore, the processor 102 may identify the desired snapshot through an identification of the data identifier 224 of the desired snapshot and may restore the data in the first volume 220 to a previous state as contained in the desired snapshot. Accordingly, for instance, through use of the data identifiers 224 disclosed herein, the processor 102 may restore the first volume 220 in a relatively simple and efficient manner.

Figure 6:
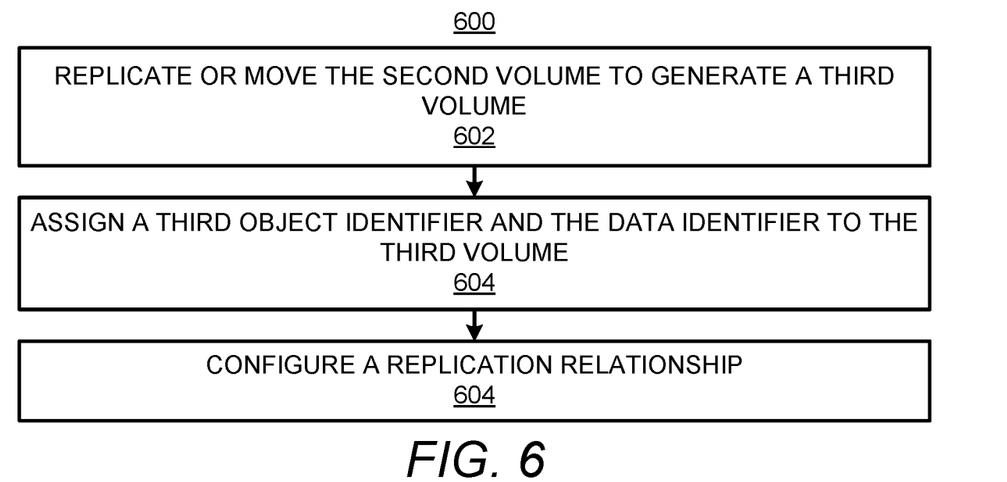
FIGS. 6-8, respectively, depict flow diagrams of example methods pertaining to various operations that a processor may implement with regard to additional volumes/snapshots in a distributed storage system.

With reference now to the example method 600 depicted in FIG. 6, at block 602, the processor 102 may replicate or move the second volume 230 to generate a third volume. In addition, at block 604, the processor 102 may assign a third object identifier and the data identifier 224 to the third volume. The third object identifier may be an identifier that is assigned exclusively to the third volume. In this regard, and because the third volume includes the common data source as the first volume 220 and the second volume 230, the third volume is also assigned the same data identifier 224. The data identifier 224 may also be assigned to other volumes that have the common data source as the first volume 220. Moreover, at block 604, the processor 102 may configure a replication relationship between the first volume 220 and the third volume.

Figure 7:
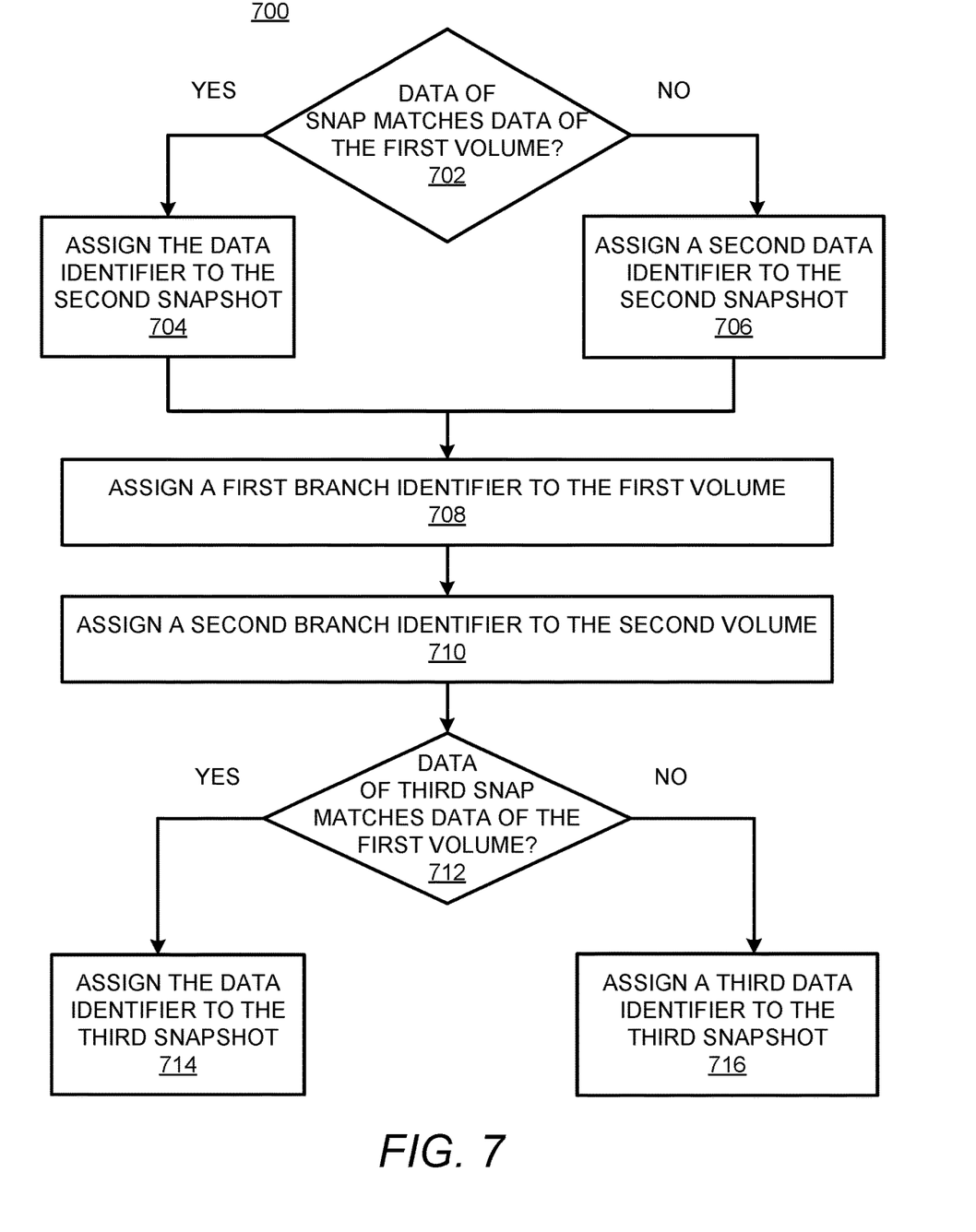

Reference is now made to the example method 700 depicted in FIG. 7. In the method 700, the first volume 220 may be part of a first replication branch 400, which the first replication branch 400 may include a first snapshot 402-1 and a second snapshot 402-2 of the first volume 220. At block 702, the processor 102 may determine whether data of the second snapshot 402-2 matches data of the first volume 220. At block 704, based on a determination that the data of the second snapshot 402-2 matches the data of the first volume 220, the processor 102 may assign the data identifier 224 to the second snapshot 402-2. However, at block 706, based on a determination that the data of the second snapshot 402-2 does not match the data of the first volume 220, the processor 102 may assign a second data identifier to the second snapshot 402-2. In other words, the processor 102 may assign a data identifier to the second snapshot 402-2 that is different from the data identifier assigned to the first volume 220.

At block 708, the processor 102 may assign a first branch identifier to the first volume 220. In addition, at block 710, the processor 102 may assign a second branch identifier to the second volume 230, in which the second volume 230 may be part of a second replication branch 404.

At block 712, the processor 102 may determine whether data of a third snapshot 402-3 matches data of the first volume 220, which may be assigned to the second replication branch 404. That is, the processor 102 may determine whether the third snapshot 402-3 shares a common data source with the first volume 220. At block 714, based on a determination that the data of the third snapshot 402-3 matches the data of the first volume 220, the processor 102 may assign the data identifier 224 to the third snapshot 402-3. However, at block 716, based on a determination that the data of the third snapshot 402-3 does not match the data of the first volume 220, the processor 102 may assign a third data identifier to the third snapshot 402-3. In other words, the processor 102 may assign a data identifier to the third snapshot 402-3 that is different from the data identifier assigned to the first volume 220.

Figure 8:
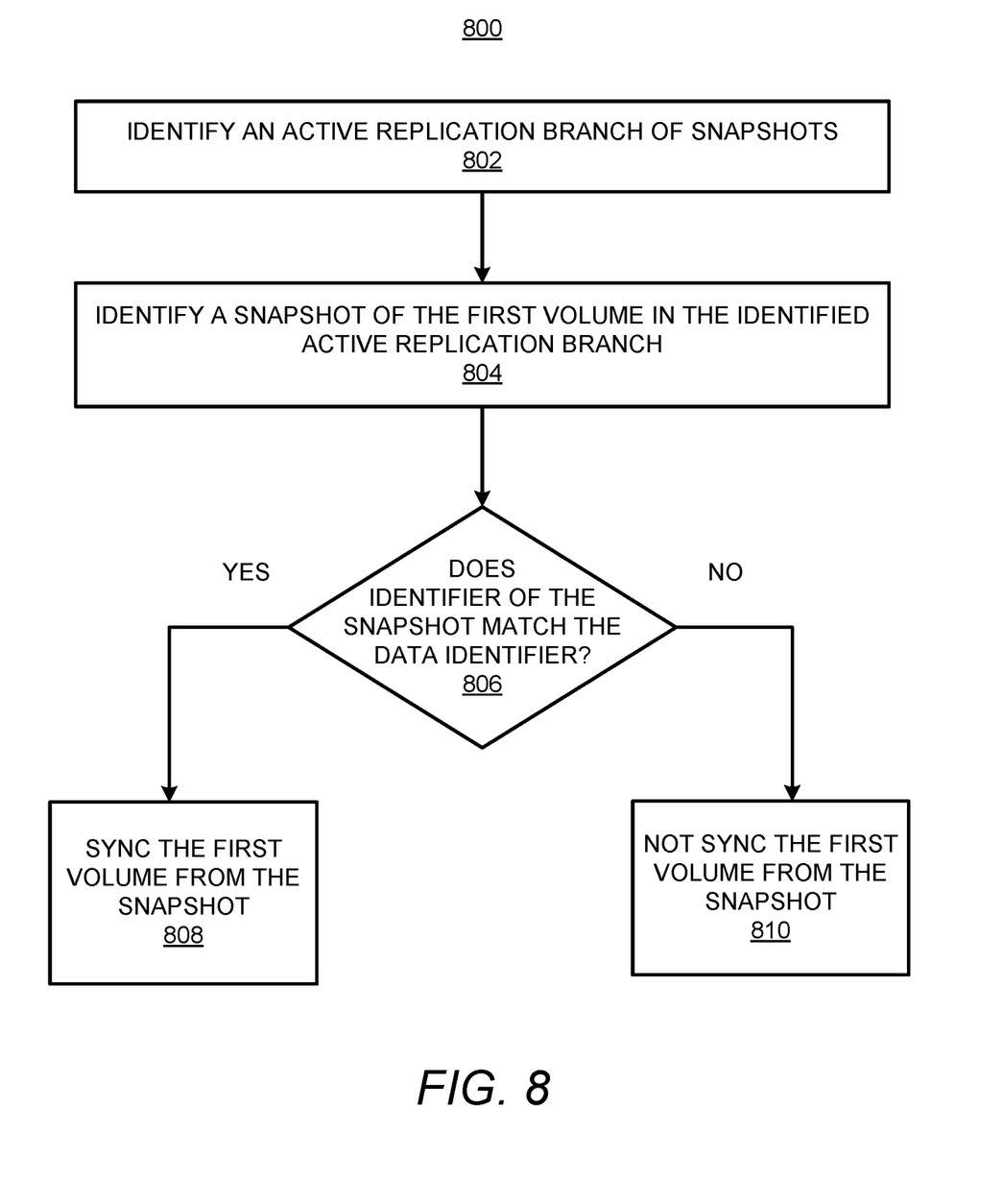

Turning now to FIG. 8, at block 802, the processor 102 may identify an active replication branch of snapshots. That is, for instance, the processor 102 may identify which of the replication branches 404-408 is currently active, e.g., contains snapshots corresponding to a most recent version of the data contained in the first volume 220. At block 804, the processor 102 may identify an identifier of a snapshot of the first volume 220 in the identified active branch. At block 806, the processor 102 may determine whether the identifier of the snapshot matches the data identifier 224 of the first volume 220. At block 808, based on a determination that the identifier of the snapshot matches the data identifier 224 of the first volume 220, the processor 102 may sync the first volume 220 from the snapshot. However, at block 810, based on a determination that the identifier of the snapshot does not match the data identifier 224 of the first volume 220, the processor 102 may not sync the first volume 220 from the snapshot. Instead, the processor 102 may identify a snapshot having the same data identifier and may use that identified snapshot to sync the first volume 220.

Through implementation of the methods 400-800, a processor 102 may manage replicas and snapshots of volumes in a manner that enables data to be uniquely identified while the data is copied or moved, e.g., via snapshot replication, sync replication, etc. That is, data may be uniquely identified even when the data is moved or replicated across storage devices, branches, volumes, etc. Thus, for instance, data that has not been modified from an original version or a particularly modified data may easily and quickly be identified. In one regard, a replica of the data, e.g., a snapshot of the data, that may be used to restore data in a volume may be identified in a relatively quick manner. As a result, the volume may be restored to a desired data state, which may reduce downtime of the volume.

Some or all of the operations set forth in the methods 500-800 may be contained as utilities, programs, or subprograms, in any desired computer accessible medium. In addition, the methods 500-800 may be embodied by computer programs, which may exist in a variety of forms. For example, some operations of the methods 500-800 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 9:
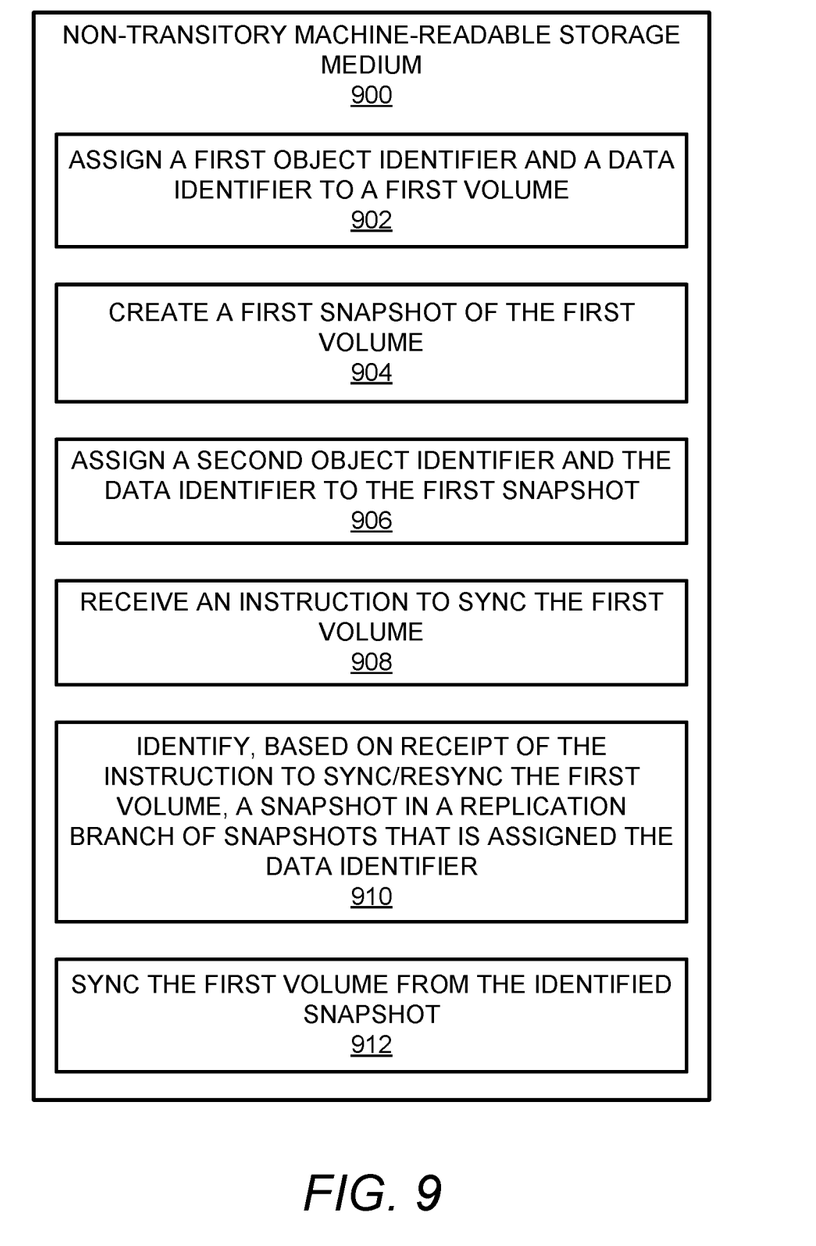
FIGS. 9 and 10, respectively, show example non-transitory machine-readable storage mediums for syncing a first volume from an identified snapshot.
Figure 10:
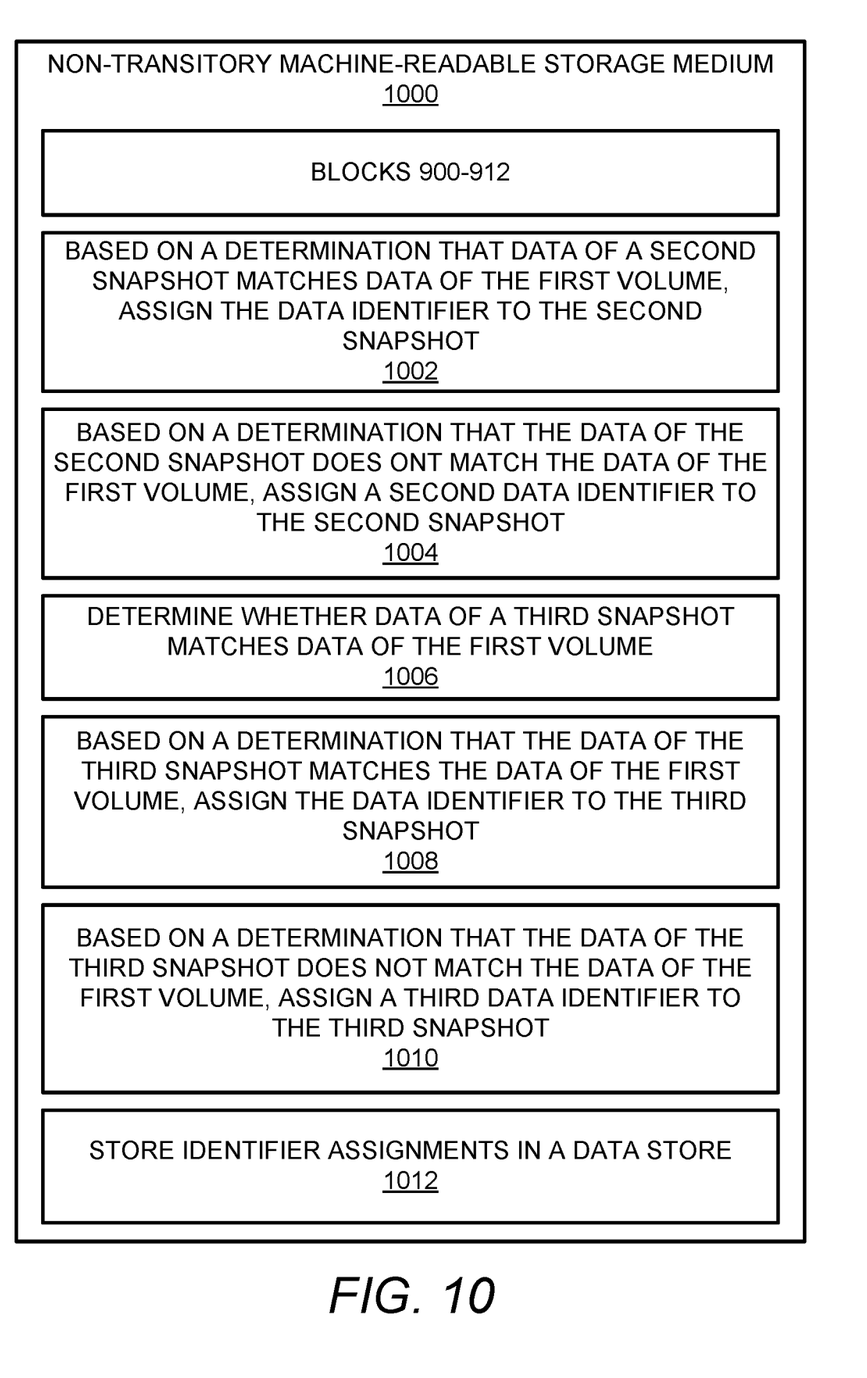

With reference now to FIGS. 9 and 10, there are respectively shown example non-transitory machine-readable storage mediums 900 and 1000 for syncing a first volume 220 from an identified snapshot. The machine-readable storage mediums 900 and 1000 may each be an electronic, magnetic, optical, or other physical storage device that contains or stores executable instructions. The machine-readable storage mediums 900 and 1000 may each be, for example, Random Access memory (RAM), an Electrically Erasable Programmable Read-Only Memory (EEPROM), a storage device, an optical disc, and the like.

With reference first to FIG. 9, the non-transitory machine-readable storage medium 900 may have stored thereon machine readable instructions 902-912 that a processor, e.g., the processor 102, may execute. The machine readable instructions 902 may cause the processor to assign a first object identifier 222 and a data identifier 224 to a first volume 220. The machine readable instructions 902 may cause the processor to create a first snapshot of the first volume 220. The machine readable instructions 906 may cause the processor to assign a second object identifier 232 and the data identifier 224 to the first snapshot of the first volume 220. The machine readable instructions 908 may cause the processor to receive an instruction to sync the first volume 220. The machine readable instructions 910 may cause the processor to identify, based on receipt of the instruction to sync the first volume 220, a snapshot in a replication branch of snapshots that is assigned the data identifier 224. In addition, the machine readable instructions 912 may cause the processor to sync the first volume 220 from the identified snapshot.

With reference now to FIG. 10, the non-transitory machine-readable storage medium 1000 may have stored thereon machine readable instructions 902-912 and 1002-1012 that a processor, e.g., the processor 102, may execute. The machine readable instructions 1002 may cause the processor to determine whether data of a second snapshot matches data of the first volume 220, in which the first volume 220 is part of a first replication branch, the first replication branch having the first snapshot and a second snapshot of the first volume 220. The machine readable instructions 1004 may cause the processor to, based on a determination that the data of the second snapshot matches the data of the first volume 220, assign the data identifier 224 to the second snapshot. The machine readable instructions 1004 may cause the processor to, based on a determination that the data of the second snapshot does not match the data of the first volume 220, assign a second data identifier to the second snapshot.

The machine readable instructions 1006 may cause the processor to determine whether data of a third snapshot of the first volume 220 matches data of the first volume 220, in which a second replication branch includes the third snapshot of the first volume 220. The machine readable instructions 1008 may cause the processor to, based on a determination that the data of the third snapshot matches the data of the first volume 220, assign the data identifier 224 to the third snapshot. The machine readable instructions 1010 may cause the processor to, based on a determination that the data of the third snapshot does not match the data of the first volume 220, assign a third data identifier to the third snapshot. The machine readable instructions 1006 may cause the processor to store the assignment of the first object identifier 222 and the data identifier 224 to the first volume 220 and the assignment of the second object identifier 232 and the data identifier 224 to the snapshot 230 of the first volume 220 in a data store.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory machine-readable storage medium comprising instructions executable by the processor to:
      assign a first object identifier and a data identifier to a first volume, the first object identifier being assigned exclusively to the first volume;
      identify an identifier of a second volume;
      determine whether the identifier of the second volume matches the data identifier; and
      based on a determination that the identifier of the second volume matches the data identifier of the first volume, configure a replication relationship between the first volume and the second volume.

2. The apparatus of claim 1, wherein the instructions are further executable by the processor to:
   create a snapshot of the second volume;
   determine that the second volume is in-sync with the first volume;
   based on the determination that the second volume is in-sync with the first volume, assign the data identifier to the snapshot of the second volume; and
   assign a snapshot identifier to the snapshot of the second volume.

3. The apparatus of claim 1, wherein the instructions are further executable by the processor to:
   replicate or move the second volume to generate a third volume; and
   assign the data identifier and a third object identifier to the third volume, the third object identifier being assigned exclusively to the third volume.

4. The apparatus of claim 1, wherein the instructions are further executable by the processor to:
   configure a replication relationship between the first volume and the third volume.

5. The apparatus of claim 1, wherein the first volume is part of a first replication branch, the first replication branch having a first snapshot and a second snapshot of the first volume, and wherein the instructions are further executable by the processor to:
   determine whether data of the second snapshot matches data of the first volume;
   based on a determination that the data of the second snapshot matches the data of the first volume, assign the data identifier to the second snapshot; and
   based on a determination that the data of the second snapshot does not match the data of the first volume, assign a second data identifier to the second snapshot.

6. The apparatus of claim 5, wherein the second volume is part of a second replication branch, and wherein the instructions are further executable by the processor to:
   assign a first branch identifier to the first volume; and
   assign a second branch identifier to the second volume.

7. The apparatus of claim 6, wherein the second branch has a third snapshot of the first volume, and wherein the instructions are further executable by the processor to:
   determine whether data of the third snapshot matches data of the first volume;
   based on a determination that the data of the third snapshot matches the data of the first volume, assign the data identifier to the third snapshot; and
   based on a determination that the data of the third snapshot does not match the data of the first volume, assign a third data identifier to the third snapshot.

8. The apparatus of claim 1, wherein the instructions are further executable by the processor to:
   identify an active branch of snapshots;
   identify a snapshot of the first volume in the identified active branch, the snapshot having an identifier;
   determine whether the identifier of the identified snapshot matches the data identifier;
   based on a determination that the identifier of the snapshot matches the data identifier, sync the first volume from the identified snapshot.

9. The apparatus of claim 1, further comprising:
   identify a snapshot in a branch of snapshots that is assigned the data identifier; and
   sync the first volume from the identified snapshot.

10. A computer-implemented method comprising:
    assigning, by a processor, a first object identifier and a data identifier to a first volume;
    replicating, by the processor, the first volume to generate a second volume;
    assigning, by the processor, a second object identifier and the data identifier to the second volume;
    identifying, by the processor, a snapshot in a branch of snapshots that is assigned the data identifier; and
    syncing, by the processor, the first volume from the identified snapshot.

11. The method of claim 10, further comprising:
    replicating or moving the second volume to generate a third volume;
    assigning a third object identifier and the data identifier to the third volume; and
    configuring a replication relationship between the first volume and the third volume.

12. The method of claim 10, wherein the first volume is part of a first replication branch, the first replication branch also having a first snapshot and a second snapshot of the first volume, the method further comprising:
    determining whether data of the second snapshot matches data of the first volume;
    based on a determination that the data of the second snapshot matches the data of the first volume, assigning the data identifier to the second snapshot; and
    based on a determination that the data of the second snapshot does not match the data of the first volume, assigning a second data identifier to the second snapshot.

13. The method of claim 12, wherein the second volume is part of a second replication branch, the method further comprising:
    assigning a first branch identifier to the first volume; and
    assigning a second branch identifier to the second volume.

14. The method of claim 13, wherein the second replication branch has a third snapshot of the first volume, the method further comprising:
- determining whether data of the third snapshot matches data of the first volume;
- based on a determination that the data of the third snapshot matches the data of the first volume, assigning the data identifier to the third snapshot; and
- based on a determination that the data of the third snapshot does not match the first volume, assigning a third data identifier to the third snapshot.

15. The method of claim 10, further comprising:
identifying an active branch of snapshots;
identifying an identifier of a snapshot of the first volume in the identified active branch;
determining whether the identifier of the snapshot matches the data identifier; and
based on a determination that the identifier of the snapshot matches the data identifier, syncing the first volume from the snapshot.

16. The method of claim 10, further comprising:
storing, by the processor and in a data store, the assignment of the first object identifier and the data identifier to the first volume and the assignment of the second object identifier and the data identifier to the second volume.

17. A non-transitory machine-readable storage medium comprising instructions that when executed by a processor are to cause a processor to:
- assign a first object identifier and a data identifier to a first volume;
- create a first snapshot of the first volume;
- assign a second object identifier and the data identifier to the first snapshot of the first volume;
- receive an instruction to sync the first volume;
- identify, based on receipt of the instruction to sync the first volume, a snapshot in a branch of snapshots that is assigned the data identifier; and
- sync the first volume from the identified snapshot.

18. The non-transitory computer readable medium of claim 17, wherein the first volume is part of a first replication branch, the first replication branch having the first snapshot and a second snapshot of the first volume, and wherein the instructions are further to cause the processor to:
- determine whether data of the second snapshot matches data of the first volume;
- based on a determination that the data of the second snapshot matches the data of the first volume, assign the data identifier to the second snapshot; and
- based on a determination that the data of the second snapshot does not match the data of the first volume, assign a second data identifier to the second snapshot.

19. The non-transitory computer readable medium of claim 17, wherein a second replication branch includes a third snapshot of the first volume, and wherein the instructions are further to cause the processor to:
- determine whether data of the third snapshot matches data of the first volume;
- based on a determination that the data of the third snapshot matches the data of the first volume, assign the data identifier to the third snapshot; and
- based on a determination that the data of the third snapshot matches the data of the first volume, assign a third data identifier to the third snapshot.

20. The non-transitory computer readable medium of claim 17, wherein the instructions are further to cause the processor to:
store the assignment of the first object identifier and the data identifier to the first volume and the assignment of the second object identifier and the data identifier to the snapshot of the first volume in a data store.

* * * * *